United States Patent [19]

Choate

[11] 4,248,268
[45] Feb. 3, 1981

[54] FLUID CONTROL SYSTEM

[76] Inventor: J. Robert Choate, P.O. Box 2409, Rochester, N.H. 03867

[21] Appl. No.: 11,046

[22] Filed: Feb. 9, 1979

Related U.S. Application Data

[62] Division of Ser. No. 810,620, Jun. 27, 1977, abandoned.

[51] Int. Cl.$^3$ .............................................. F16L 55/04
[52] U.S. Cl. ........................................ 138/26; 138/31; 138/46; 239/533.4; 239/533.6; 60/591; 92/143
[58] Field of Search ......................... 138/26, 30, 31, 43, 138/44, 46; 239/533.4, 533.6; 60/591; 417/426; 92/143

[56] References Cited

U.S. PATENT DOCUMENTS

| | | | |
|---|---|---|---|
| 2,673,527 | 3/1954 | Ashton et al. | 138/31 X |
| 3,174,505 | 3/1965 | Bauer | 138/31 X |
| 3,348,579 | 10/1967 | Swift et al. | 138/31 |
| 3,648,570 | 3/1972 | Koch | 92/143 X |
| 3,780,621 | 12/1973 | Romall | 138/31 X |
| 3,906,839 | 9/1975 | Schexnayder | 130/31 X |

Primary Examiner—James E. Bryant, III
Attorney, Agent, or Firm—Cook, Wetzel & Egan, Ltd.

[57] ABSTRACT

A fluid pulse smoother is described which receives pulses of fluid to provide a continuous drive for a workpiece. The pulse smoother receives a sequence of periodic fluid pulses, as from a pulse generator, and integrates or spreads each received fluid pulse over the time duration of each pulse. Consequently, a workpiece may receive a driving fluid flow which is continuous but whose rate of flow is substantially equivalent to the rate of fluid flow associated with the fluid pulses. Hence, the pulse smoother provides a fluid control system for converting a sequence of fluid pulses to a continuous fluid flow of a known volume and flow rate for precisely driving a fluid controlled workpiece.

15 Claims, 3 Drawing Figures

FLUID CONTROL SYSTEM

This is a division, of application Ser. No. 810,620, filed June 27, 1977 now abandoned.

BACKGROUND OF THE INVENTION

This invention is directed generally to the field of hydraulic control and more specifically to devices for hydraulically positioning a workpiece in response to electrical control signals.

Prior hydraulic systems have been devised for crudely positioning a workpiece such as a hydraulically operated piston. However, when such systems have been modified to exert more precise control over the distance to be moved or the rate of movement of a workpiece, it has been found necessary to include a complex assortment of plumbing hardware in the basic hydraulic system. For example, flow control valves, pressure regulators, check valves, analog servo valves, etc., have been conventionally used in analog fluid control systems.

In addition to requiring a complex array of plumbing hardware, prior hydraulic systems have typically included an equally complex electronic control system, thereby rendering the over-all system very expensive. Moreover, the precision and reliability of such prior systems vary with variations in the temperature and pressure of the fluid, as well as the extent of air entrapment in the fluid.

OBJECTS OF THE INVENTION

Accordingly, it is an object of this invention to provide an improved hydraulic control system which overcomes the above-noted deficiencies of prior systems.

It is a more specific object of this invention to provide a simple and reliable device for receiving periodic fluid pulses and for smoothing those pulses into a continuous flow of fluid for continuously driving a workpiece.

BRIEF DESCRIPTION OF THE DRAWINGS

The above and other objects of the invention are more particularly set forth in the following detailed description and in the accompanying drawings of which.

DESCRIPTION OF THE PREFERRED EMBODIMENT

Figure 1:
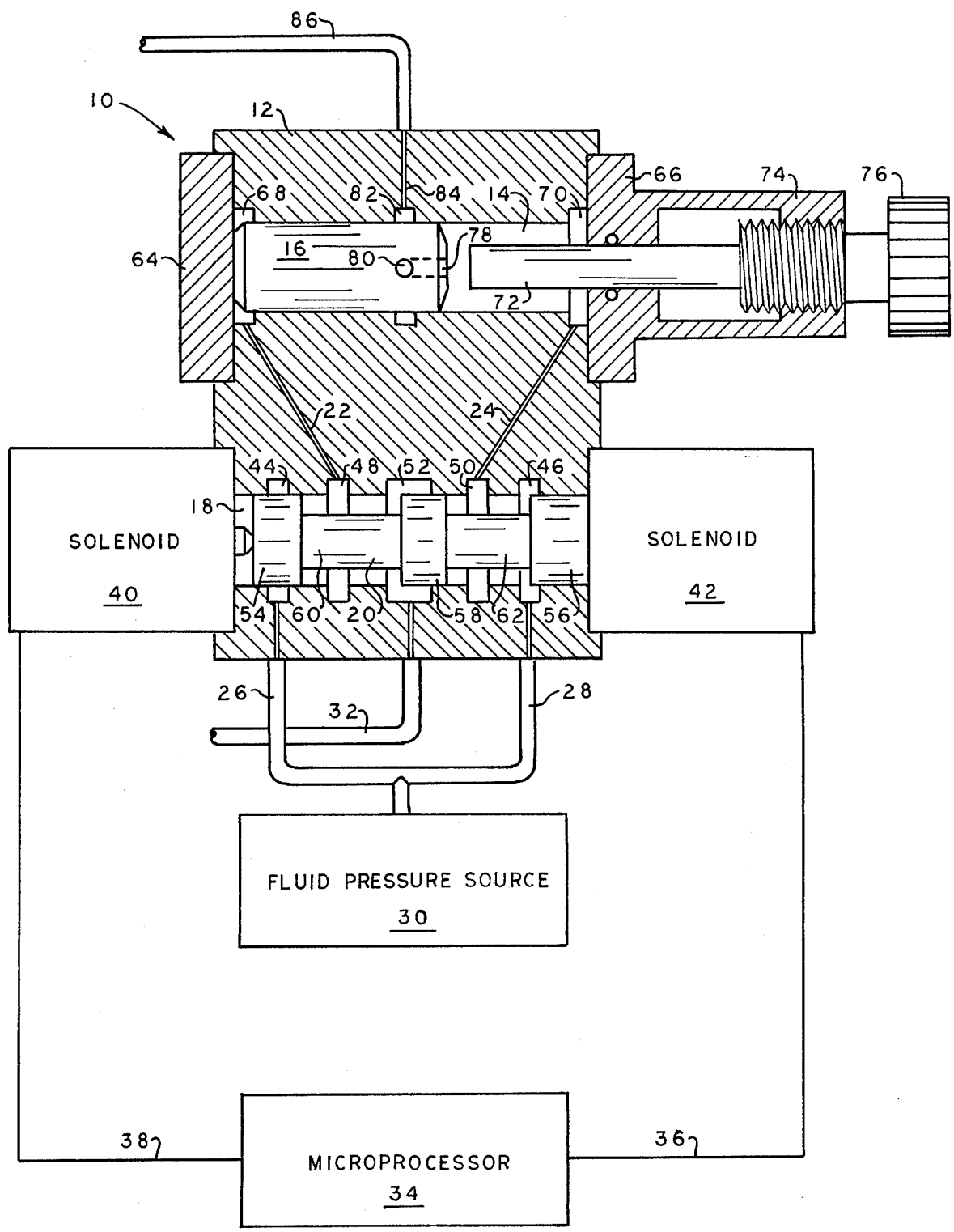
FIG. 1 is a partly sectional view of a fluid pulse generator for developing pulses of fluid for input to the pulse smoother which embodies the invention.

According to the invention, a pulse smoother receives a train of fluid pulses and integrates or smooths the fluid pulses to provide a continuous flow of fluid whose volume and rate of flow corresponds to the volume and rate of flow of fluid associated with the received fluid pulses Hence, a workpiece may be driven smoothly and continuously over a predetermined distance by the steady flow of fluid from the pulse smoother merely by providing the necessary number of fluid pulses to the smoother.

In the preferred embodiment, the pulse smoother includes an accumulator cavity for receiving pulses of fluid from a pulse generator described herein, and a flow restriction chamber receiving the fluid from the accumulator cavity. The flow restriction chamber includes an output at which fluid emerges in a steady flow for continuously driving a workpiece.

To ensure that the rate of fluid flow from the flow-restriction chamber is substantially equal to the rate of fluid flow into the accumulator cavity, means are provided for limiting the flow of fluid between the input and the output of the flow-restriction chamber such that a volume of fluid substantially equal to the volume of fluid in a single fluid pulse emerges from the output of the flow-restriction chamber at a substantially constant rate over an interval substantially equal to the period of a single fluid phase. Hence, the fluid pulses received by the accumulator cavity are substantially integrated and smoothed to form, at the output of the flow-restriction chamber, a continuous flow of fluid at a rate which is substantially equal to the rate at which fluid is received by the accumulator cavity.

When a workpiece is desired to be moved in an incremental fashion, the pulse generator may be used without the pulse smoother. In this case, a microprocessor may be programmed to develop a sequence of electrical pulses whose number and frequency corresponds to the distance the workpiece must travel in a given time. The pulse generator may then develop a corresponding sequence of fluid pulses of predetermined volume for advancing the workpiece incrementally over the prescribed distance in time allotted.

It is recognized that the hydraulic pulse may emit within a fractional portion of the total time span allotted by the electronic microprocessor for one pulse increment, depending on the rate or frequency selected. This would urge the workpiece forward in a series of separate increments, producing an intermittant motion. The purpose of the pulse smoother is to spread the volume of an emitted pulse over the whole time span allotted so that the train of hydraulic pulses join end to end to produce a continuous flow.

When the pulse smoother is used in conjunction with the pulse generator, the fluid pulses are integrated to form a continuous flow of fluid for smoothly advancing a workpiece. Moreover, the total volume of fluid provided by the smoother in a predetermined time period is equal to the total volume of fluid provided by the pulse generator during the same predetermined period of time. Accordingly, a workpiece may be advanced smoothly and accurately to a working position by the conversion of a sequence of electrical signals to a steady flow of fluid of known volume and known flow rate.

Figure 2:
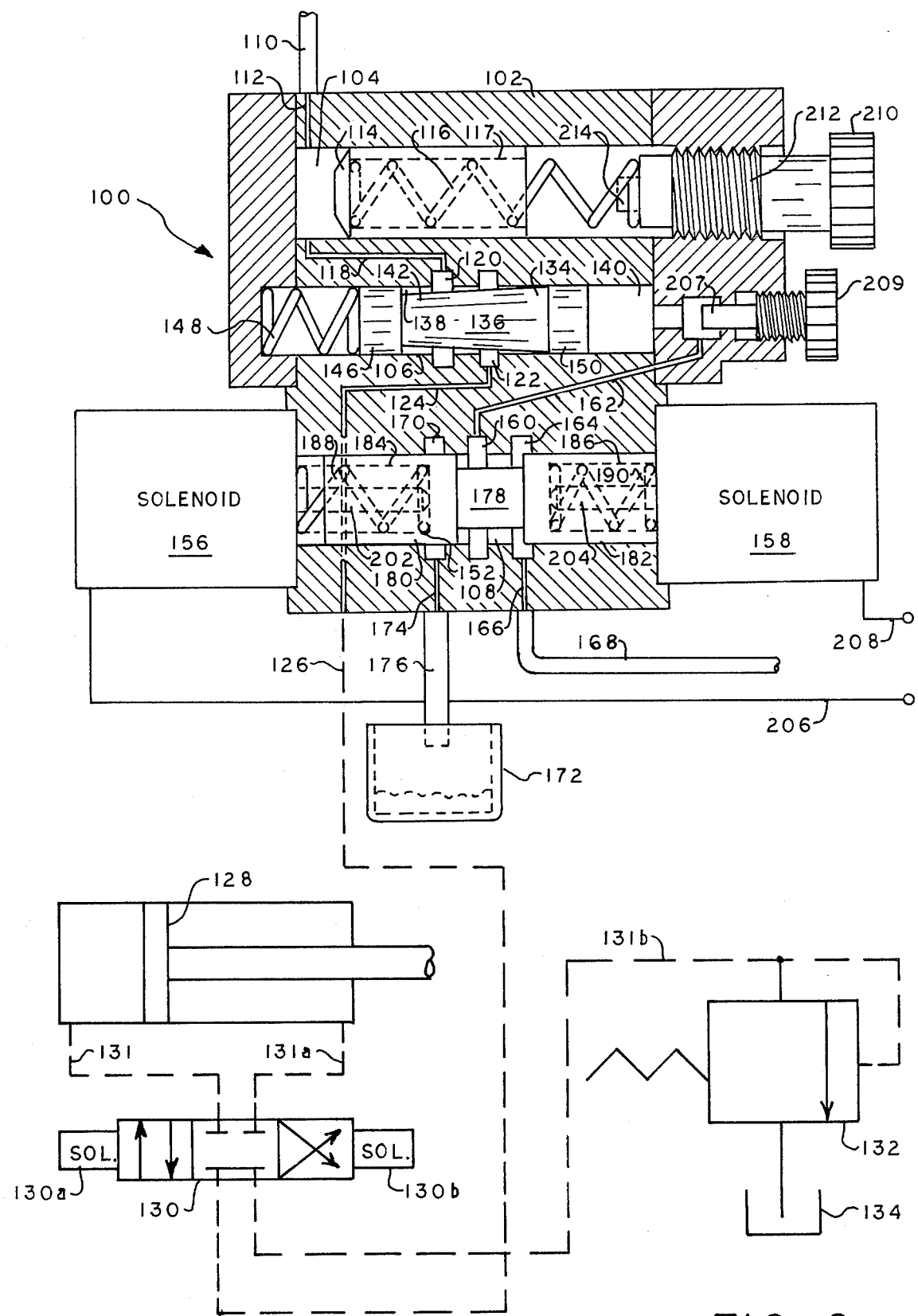
FIG. 2 is a partly sectional view of a device for receiving periodic fluid pulses and for smoothing those pulses into a continuous flow of fluid in accordance with the invention.

Referring now to FIG. 1, there is shown a fluid pulse generator 10 which may be used to develop fluid pulses for input to the pulse smoother depicted in FIG. 2. The illustrated generator is not a part of the present invention which is directed to the pulse smoother. However, a detailed description of the pulse generator is provided to better understand the way in which the pulse smoother of FIG. 2 interfaces with the pulse generator. As shown, the major components of the generator 10 include a housing 12, a cylindrical cavity 14 for holding a predetermined volume of fluid (preferably oil), a piston 16 for reciprocating in the cavity 14 for developing fluid pulses, a cylindrical valve bore 18, and a cylindrical spool valve 20 situated in the bore 18 for selectively coupling fluid into and out of the cavity 14. Fluid communication between the cavity 14 and the valve 20 is established by a pair of internal conduits or bores 22 and 24.

Generally, the pulse generator 10 receives a continuous flow of pressure from a fluid source 30 via a pair of conduits 26 and 28 and generates a succession of fluid pulses, each of a predetermined volume at a fluid outlet 32.

The generation of fluid pulses at the fluid outlet 32 is initiated by an electronic control such as microprocessor 34. The microprocessor 34 may be programmed to deliver a succession of electrical signals in the form of pulses on leads 36 and 38 for alternately actuating a pair of solenoids 40 and 42, the latter of which reciprocate the spool valve 20 in the bore 18. Generally, the first stroke of the spool valve 20 causes one of the conduits, conduit 22 for example, to be coupled to the fluid source 30 and the other conduit 24 to be coupled to the fluid outlet 32. The next or reverse stroke of the spool valve 20 causes the conduit 24 to be coupled to the fluid source 30 and the conduit 22 to be coupled to the fluid outlet 32. The cycle continues as solenoids 40 and 42 are sequentially activated to alternately couple each conduit 22, 24 first to the fluid source 30 and then to the fluid outlet 32.

As a result of the conduits 22 and 24 being alternately coupled to the fluid source 30, and the fluid outlet 32, the cavity 14 is filled with fluid first on one side of the piston 16 and then on the other side of the piston 16. Consequently, the piston 16 is urged by fluid pressure to reciprocate in the cavity 14 for impelling fluid alternately out of the conduits 22 and 24. For example, when the conduit 22 is coupled to the fluid source 30, the piston 16 will be forced to the right as viewed in FIG. 1 for impelling fluid out of the conduit 24, which is now coupled through the bore 18 to the fluid outlet 32. When the valve spool 20 couples the conduit 24 to the fluid source 30, fluid will enter the cavity 14 and urge the piston 16 to the left, thereby impelling the fluid which was previously introduced via conduit 22 out through conduit 22, the latter now being coupled to the fluid outlet 32. Thus, for each actuation of one of the solenoids 40, 42, a single fluid pulse emerges from the fluid outlet 32, each pulse having a volume which is determined by the volume of the cavity 14 and the length of the stroke of the piston 16. As will be discussed below, the stroke of the piston may be varied to vary the fluid volume of the generated fluid pulses.

The structure associated with the housing 10 which provides for the selective coupling of fluid between the cavity 14 and the bore 18 will now be discussed in more detail. Referring first to the bore 18, it has a pair of internal fluid input ports defined by a pair of annular grooves 44 and 46 which surround the spool 20, a pair of fluid exchange ports defined by a pair of annular grooves 48 and 50, and an output port defined by another annular groove 52. Fluid communication among selected of the annular grooves 44-50 is achieved by contouring the spool 20 as shown such that the spool 20 has opposed ends 54 and 56 whose diameters are substantially equal to the diameter of the bore 18 and a center land portion 58 whose diameter is also substantially equal to the diameter of the bore 18. Between the center land portion 58 and the end portions 54 and 56, there are a pair of small diameter portions 60 and 62, the latter of which serve to couple fluid between selected annular grooves. The center land portion 58 and the end portions 54 and 56 serve, of course, to seal the fluid between them and to seal off fluid from the annular grooves which they underlie at any given time.

As shown in FIG. 1, the end portions 54 and 56 of the spool 20 communicate with the solenoids 40 and 42, respectively, so that upon actuation of the solenoid 40, for example, the spool 20 will be urged to the right as shown. Conversely, when the solenoid 42 is actuated, the spool 20 will be driven to the left.

When the spool 20 is in the position shown, fluid will flow from the fluid source 30 through the conduit 28 and into the annular groove 46. Because the small diameter portion 62 of the spool 20 now at least partially overlies the grooves 46 and 50, fluid may flow from the annular groove 46, past the small diameter portion 62 of the spool 20, and into the groove 50, whereupon it is conducted via the conduit 24 to the right side of the cavity 14.

The illustrated position of the spool 20 also results in the small diameter portion 60 of the spool 20 at least partially overlying the annular grooves 48 and 52 for establishing fluid coupling therebetween. Consequently, fluid flow is established between the conduit 22, the grooves 48 and 52, and the fluid outlet 32. Thus, while the conduit 24 is coupled by the spool 20 to the fluid source 30, the conduit 22 is simultaneously coupled to the fluid outlet 32.

When the solenoid 42 is actuated, the spool 20 is moved to the left, whereupon the small diameter portion 62 of the spool 20 at least partially overlies the grooves 50 and 52, thereby establishing fluid coupling between the conduit 24, the annular grooves 50 and 52, and the fluid outlet 32. Simultaneously, the small diameter portion 60 of the spool 20 at least partially overlies the annular grooves 44 and 48, thereby establishing fluid communication between these latter grooves. As a result, the conduit 22 is coupled to the fluid source 30 via annular grooves 48 and 44 and the conduit 26.

Referring now to the cavity 14, it is sealed by a first end enclosure 64 and a second end enclosure 66 disposed at opposite ends of the cavity 14. In that portion of the cavity adjacent the enclosure 64 there is a fluid exchange port defined by an annular groove 68 communicating with the conduit 22. At the opposite end of the cavity 14, there is another fluid exchange port defined by an annular groove 70 which communicates with the conduit 24. Thus, when the conduit 24 is coupled to the fluid source 30, fluid flows into the cavity 14 via the annular groove 70 and urges the piston 16 toward the left as shown. The latter movement of the piston 16 urges fluid out of the cavity 14 via the annular groove 68 and the conduit 22 and from there to the fluid outlet 32.

When the conduit 22 is coupled to the fluid source 30, fluid flows into the cavity 14 via the annular groove 68 for urging the piston 16 to the right and impelling fluid out of the cavity 14 via the annular groove 70, the conduit 24 and thence to the fluid outlet 32.

In order to limit the stroke of the piston 16, and also the volume of oil which is displaced from the cavity 14 by each stroke of the piston 16, a shaft 72 is situated to protrude into the cavity 14 and to abut the piston 16 when it is stroked in the direction of the shaft 72. In order to vary the stroke of the piston 16, the shaft 72 is threaded in a retainer 74 and coupled to a manually adjustable knob 76. Turning the knob 76 results in the shaft 72 moving axially within the cavity 14 and thereby varying the stroke limit of the piston 16. Thus, the volume of oil which is expelled during each stroke of the piston 16 may be conveniently set by the knob 76.

The pulse generator 10 may be used to incrementally drive a workpiece such as a hydraulic piston, or any other hydraulically operated device. When so used, the fluid outlet 32 may be coupled to the device being operated on through one or more standard valves. The information needed to set up and drive the pulse generator 10 includes the distance which the generator 10 is to move a workpiece and the size of the incremental moves which it is desired to give to the workpiece. The size of the incremental moves will correspond, of course, to the volume of each pulse emerging from the fluid outlet 32, and the rate at which the workpiece is moved will correspond to the rate of actuation of the solenoids 40 and 42. The knob 76 is then turned to adjust the volume of fluid expelled by the piston 16 on each of its strokes so that each fluid pulse emerging from the fluid outlet 32 advances the workpiece by the desired increment. In addition, an electronic control such as the microprocessor 34 is programmed in a well known manner to alternately actuate the solenoids 40 and 42 at the desired rate in order to develop fluid pulses of a corresponding rate for advancing the workpiece. For example, if it is known that a workpiece must be moved 10 inches in increments of 1/10th inch, the knob 76 is adjusted to provide fluid pulses at the fluid outlet 32 whose volume will impart an incremental movement to the workpiece of 1/10th inch each and the electronic control or microprocessor is programmed to generate 100 electrical pulses on the leads 36 and 38 for developing 100 fluid pulses at the fluid outlet 32.

Assuming that the first electrical pulse appears at the lead 38, the solenoid 40 will urge the valve 20 to the right as shown whereupon fluid will be conducted from the fluid source 30 to the conduit 28, the annular grooves 46 and 50, the conduit 24, the annular groove 70, and into the cavity 14 to force the piston 16 to the left as shown. The fluid which previously occupied that portion of the cavity 14 to the left of the piston 16 will be impelled out of the cavity 14 via the annular groove 68, the conduit 22, annular grooves 48 and 52, to the fluid outlet 32. The next electrical pulse will appear on the lead 36 for actuating the solenoid 42 to move the valve 20 to the left. Now the fluid source 30 will be coupled to the cavity 14 via the conduit 26, annular grooves 44 and 48, conduit 22, and annular groove 68. The piston 16 will then be forced to the right to force fluid out of the cavity 14 via the annular groove 70, the conduit 24, annular grooves 50 and 52, and into the fluid outlet 32. This cycle will repeat with the valve spool 20 and the piston 16 reciprocating in the manner described above for as long as electrical pulses are received via the leads 36 and 38.

As pointed out above, the pulse generator 10 may be used either alone or in conjunction with a pulse smoother which integrates the pulses emerging from the fluid outlet 32 into a continuous stream of fluid for smoothly and continuously imparting motion to a workpiece. When so used with a smoother, the pulse generator 10 preferably includes means for sending the smoother a first fluid pulse for conditioning the smoother to deliver a steady flow of fluid whose volume during any time interval is equal to the volume of fluid emerging from the fluid outlet 32 during the same time interval. Thus, the direct correspondence between the volume of fluid flow driving the workpiece and the number of electrical pulses actuating the solenoids 40 and 42 is retained. Toward this end, the piston 16 includes a bore 78 disposed centrally of the piston 16 and along its longitudinal axis. The bore 78 communicates with an opening 80 in the exterior surface of the piston 16 so that fluid may flow from that portion of the cavity 14 which is to the right of the piston 16 through the bore 78 and out through the opening 80. To couple the fluid from the opening 80 to a pulse smoother, a pulse conditioning port in the form of an annular groove 82 is formed in the interior surface of the cavity 14 and disposed to be aligned with the opening 80 when the piston 16 is in the position shown. The annular groove 82 is coupled via an internal conduit 84 to an external conduit 86 which feeds a pulse smoother. The operation and the function of the internal bore 78 and associated structure for coupling fluid to the conduit 86 will be described more completely below in connection with the description of an embodiment of a pulse smoother in accordance with this invention.

Referring now to FIG. 2, there is shown an embodiment of a fluid pulse smoother 100 in accordance with this invention. The fluid pulse smoother 100 preferably is used in conjunction with the pulse generator of FIG. 1 for converting the fluid pulses emerging from the fluid outlet 32 of the pulse generator 10 to a steady flow of fluid whose volume is substantially equal to the volume of fluid emerging from the fluid outlet 32 over any predetermined interval of time to maintain a direct correspondence between the volume and rate of fluid which emerges from the pulse smoother 100 and the number and rate of electrical signals actuating the pulse generator 100.

As shown, the pulse smoother 100 has a housing 102 which encloses a fluid accumulator cavity 104, a cylindrical bore 106 and a cylindrical valve bore 108. Generally, the pulse smoother 100 receives a train of fluid pulses via an input conduit 110, these pulses being conveyed to the accumulator cavity 104 via an internal bore or conduit 112. Disposed within the accumulator cavity 104 is a resilient piston 114 which is spring biased in the direction of the conduit 112 by a spring 116 situated in an internal bore 117 in the piston 114. The function of the resilient piston 114 is to absorb the fluid pulses which are conducted into the cavity 104 and for urging the fluid out of the cavity 104 via an output port 118.

The fluid entering the output port 118 is conducted to a bore input port defined by an annular groove 120 surrounding the bore 106. From the input port 120 the fluid flows into the bore 106, to an output port defined by another annular groove 122 and from there to an internal conduit 124 which is coupled to an external outlet conduit 126. As will be evident from the discussion hereinafter, the fluid which emerges from the outlet conduit 126 is a steady flow of fluid which may be used to drive a workpiece such as a hydraulic piston 128 shown schematically in the drawings. Between the conduit 126 and the piston 128 there is a conventional three position valve 130 coupled to the piston 128 by a pair of conduits 131 and 131a. The valve 130 is coupled to a conventional back pressure valve 132 by a conduit 131b and thence to a fluid reservoir 134.

The valve 130 includes an internal spool (not shown) which is spring biased to an illustrated center position and which is movable between two other positions by a pair of solenoids 130a and 130b. With the solenoids 130a and 130b de-energized, the valve 130 couples the conduit 126 to the conduit 131b to maintain back pressure on the conduit 126. When one of the solenoids 130a, 130b Is energized, the conduit 126 is coupled to one of the conduits 131 or 131a for urging the piston 128 in a desired direction. The other of the conduits 131, 131a is simultaneously coupled to the conduit 131b to maintain back pressure on the piston to ensure that it moves smoothly. Preferably, the solenoids 130a and 130b are energized by the microprocessor 34 (FIG. 1).

The valves 130 and 132 form no part of this invention but are shown schematically merely to illustrate an exemplary type of structure which the smoother 100 may be used to drive.

The conversion of the fluid pulses to a steady flow of fluid is effected primarily in the bore 106 by a flow regulator member 136 which divides the bore 106 into two portions, a flow-restriction chamber 138 and a fluid reservoir 140. As shown, the flow regulator member 136 has a tapered end 142 whose diameter is smaller than the diameter of the flow-restriction chamber 138 and an opposed end 134 whose diameter is substantially equal to the diameter of the bore 106.

Also situated within the bore 106 is a first circular sealing member 146 spring-biased toward the center of the bore 106 by a spring 148. Another circular sealing member 150 seals the fluid reservoir 140 from the flow-restriction chamber 138. Thus the sealing members 146 and 150 serve to retain the fluid which enters the bore 106 inside the flow-restriction chamber 138.

The function of the flow-restriction member 136 is to restrict the flow of fluid between the annular groove 120 and the annular groove 122 to a predetermined flow rate. Thus, if the flow-restriction member 136 is urged to the right in FIG. 2 by the spring 148, the smaller diameter of the tapered portion 142 of the flow-restriction member 136 will be situated between the groove 120 and the groove 122 to permit the fluid to flow relatively fast between these latter grooves. Conversely, when the flow restriction member 136 is urged to the left in FIG. 2 against the bias of the spring 148, the larger diameter of the tapered end 142 of the flow-restriction member 136 will be situated between the grooves 120 and 122, thereby constricting the flow of fluid between those grooves. As will be described more fully hereinafter, the position of the flow constriction member 136 may be automatically set such that the amount of fluid emerging from the groove 122 during any predetermined interval is equivalent to the same volume of fluid received at the conduit 110 during the same predetermined interval. Briefly, such positioning of the flow-restriction member 136 may be effected by filling the fluid reservoir 140 with a predetermined volume of fluid, whereupon the flow-restriction member 136 is urged to the left against the bias of the spring 148 to constrict the flow of fluid between the grooves 120 and 122 such that the volume of fluid flowing between the latter grooves during the period of a single fluid pulse is substantially equal to the volume of fluid contained in a single fluid pulse.

The structure for filling the reservoir 140 with fluid to position the flow regulator member 136 between the grooves 120 and 122 includes a spool valve 152 situated in the bore 108, and a pair of solenoids 156 and 158 for moving the spool valve 152 axially within the bore 108. As will be described, the spool valve 152 may occupy one of three discrete positions, a first position wherein the spool valve 152 couples a fluid pulse into the reservoir 140, a second position wherein the spool valve 152 couples the reservoir 140 to a fluid container for emptying the reservoir 140 of fluid, and a third or rest position in which the spool valve 152 closes the reservoir 140 so that fluid is retained therein.

Fluid coupling to the reservoir 140 is controlled by the position of the spool valve 152 with respect to the three illustrated annular grooves surrounding the bore 108. Groove 160 defines a fluid exchange port which conveys fluid to and from the reservoir 140 via an internal bore or conduit 162. Groove 164 defines a fluid input port which is coupled to a source of fluid pulses via an internal bore or conduit 166 and an external conduit 168. Groove 170 defines an output port which is coupled to a fluid container 172 via an internal bore or conduit 174 and an external conduit 176. As will be seen, the groove 160 is sealed from the grooves 164 and 170 when the spool valve 152 is in a rest position, is coupled to the groove 164 when it is desired to fill the reservoir 140, and is coupled to the groove 170 when it is desired to empty the reservoir 140 into the container 172.

To selectably couple or decouple the groove 160 from the grooves 164 and 170, the spool valve 152 is contoured to have a small diameter center portion 178 disposed between larger diameter end portions 180 and 182, the latter of which have diameters which are substantially equal to the diameter of the bore 108.

To maintain the valve spool 152 in a center or rest position when the solenoids 156 and 158 are deactivated, the valve spool 152 includes a pair of bores 184 and 186 in the end portions 180 and 182, respectively, with springs 188 and 190 located within the bores 184 and 186, respectively. The spool 152 is maintained in a centered position by the bias of the springs 188 and 190 each urging the valve spool 152 to its center position wherein the small diameter portion 178 is communicating only with the groove 160, thereby sealing the reservoir 140 from any communication with the grooves 164 and 170. In this condition, any fluid which is in the reservoir 140 will be unable to escape.

Axial movement of the valve spool 152 is effected by actuation of the solenoids 156 and 158 whose plungers 202 and 204 are disposed within the bores 184 and 186, respectively. Accordingly, when the solenoid 156 is activated, its plunger 202 will urge the valve spool 152 to the right, whereas activation of the solenoid 158 will cause its plunger 204 to urge the valve spool 152 to the left. As pointed out above, when neither of the solenoids 156 or 158 is activated, the springs 188 and 190 will maintain valve spool 152 in a centered position.

Preferably, before the smoother 100 receives any fluid pulses via the conduit 110, the reservoir 140 will be filled with the desired volume of fluid. Such may be effected by coupling the conduit 168 to a source of fluid pulses and activating the solenoid 156 to urge the spool valve 152 to the position shown. This operation will couple fluid to the reservoir 140 via the conduits 168 and 166, grooves 164 and 160 and the conduit 162. The solenoid 156 remains activated only for an interval which is sufficient to couple the desired volume of fluid into the reservoir 140, after which the solenoid 156 is deactivated and the springs 188 and 190 return the spool valve 152 to a center position, thereby closing the reservoir 140.

The fluid for the reservoir 140 is preferably obtained by coupling the conduit 168 to the conduit 86 (FIG. 1) of the pulse generator 10 and connecting the solenoids 156 and 158 (FIG. 2) via leads 206 and 208 to the microprocessor 34. Further, the fluid pulses received by the accumulator cavity are preferably obtained by coupling the conduit 110 to the outlet conduit 32 (FIG. 1) of the pulse generator 10. The microprocessor 34 may be programmed by well known manner to drive the solenoids 40 and 42 of the pulse generator 10 and the solenoids 156 and 158 of the pulse smoother 100 in the manner described immediately below.

First, the solenoid 42 is activated to ensure that the piston 16 is positioned to the right in FIG. 1. The step merely sets up the pulse generator 10 for calibrating the smoother 100.

Next, the solenoid 156 is activated to move the spool valve 180 to its illustrated position wherein the reservoir 140 is coupled to the conduit 168 via the conduit 162, annular grooves 160 and 164 and the internal conduit 166. At this point the reservoir 140 is conditioned to receive fluid from the pulse generator 10.

Next, the solenoid 40 is activated to move the piston 16 to the left at the position shown, whereupon fluid flows through the piston bore 78, the aperture 80, the groove 82, the conduits 86 and 163, and into the reservoir 140.

Solenoid 42 is then activated to return the piston 16 to the right, whereupon fluid coupling is broken between the groove 82 and the aperture 80 and no more fluid can flow to the reservoir 240. The solenoid 156 is deactivated to release the valve spool 152 to its center position, thereby closing the reservoir 140 for retaining the fluid previously injected therein.

The result of the above described sequence of steps is that fluid flows into the reservoir 140 only while the piston 16 is in the dwell conditon shown. Accordingly, fluid flows into the reservoir 140 only during the interval between the pulses generated by the piston 16. As a result, the flow-regulator member 136 is urged between the grooves 120 and 122 to the extent required to constrict the flow of fluid therebetween such that fluid flows substantially continually out of the groove 122 at a rate which corresponds to the rate of fluid flow in the train of fluid pulses generated by the pulse generator 10. Stated another way, the flow-regulator member 136 constricts the flow of fluid between the grooves 120 and 122 such that the output of the groove 122 is substantially an integrated version of the fluid pulses received at the conduit 110.

In order to ensure that the reservoir 140 receives the desired volume of fluid, the interval between the actuation of the solenoids 40 and 42 during the time when the reservoir 140 is receiving fluid should be the same as subsequent intervals therebetween when the calibration of the pulse smoother 100 is complete. In this way, the pulse smoother 100 is calibrated for the subsequent fluid pulses which it receives and integrates.

In order to accommodate tolerances in the calibration of the smoother 100, a manually adjustable displacement valve 207 (FIG. 2) is provided. The valve 207 protrudes into the reservoir 140 and has a manually adjustable knob 209 for adjusting the over-all volume of the reservoir 140 and thus also the position of the flow-regulator 136. Hence, the flow-regulator 136 may be precisely set for any pulse train.

To adjust the piston 114 in the accumulator cavity 104 to accommodate various system configurations, a manually adjustable knob 210 is provided. The knob 210 is coupled to a threaded shaft 212, the latter terminating in a small diameter rod 214. The spring 116 abuts the shaft 212 and is compressed or extended when the knob 210 is turned, depending on the direction of rotation of the knob 210. Thus the pressure which the spring 116 exerts on the piston 114 may be varied to ensure that the pressure exerted on the fluid in the cavity 104 is greater than the back pressure in port 118 but less than the line pressure on the conduit 110.

After the pulse smoother 100 has been calibrated as described above, the solenoids 40 and 42 are alternately actuated by the microprocessor 34 to generate a predetermined number of fluid pulses which are coupled from the outlet 32 of the pulse generator 10 to the input conduit 110 of the pulse smoother 100. All of these pulses are smoothed as described above and a steady flow of fluid emerges from the conduit 126 to drive a workpiece.

Assuming that the pulse generator has completed its generation of fluid pulses and it is desired to generate a new set of fluid pulses whose volume and rate are different from the first set of pulses, the pulse smoother 100 may be automatically calibrated to smooth the new set of pulses by going through the calibration procedure described above. Prior to such further calibration, however, the reservoir 140 must be emptied of the fluid previously injected therein. This is accomplished by actuating the solenoid 158 to drive the valve spool 152 to the left, thereby coupling the reservoir 140 to the fluid container 172 via the conduit 162, annular grooves 160 and 170 and conduits 174 and 176. Now the fluid previously injected into the reservoir 140 flows into the container 172 and the pulse smoother 100 is ready for re-calibration.

The combination of one pulse generator and one pulse smoother provides a simple and reliable device for driving a workpiece a predetermined distance in response to a sequence of periodic digital signals. Of course, when only one pulse generator is used, the workpiece can be moved only over a distance which is a multiple of the incremental movement provided by a single pulse. Where it is desirable to have more flexibility over the distance which the workpiece can be moved, a plurality of pulse generators may be used in connection with a single pulse smoother, and the pulse generators may be activated sequentially. For example, referring to FIG. 3, there is shown a microprocessor 300 coupled to a first pulse generator 302, a second pulse generator 304, and a third pulse generator 306. The pulse generators may all be similar to the pulse generator 10 shown in FIG. 1, but each is adapted to develop output pulses whose fluid volumes move a workpiece different incremental distances. For example, the pulse generator 302 may be set to develop pulses for moving a workpiece in increments of 0.010 inch, the pulse generator 304 may be set to develop pulses for moving a workpiece in increments of 0.001 inch, and the pulse generator 306 may be set to develop pulses for moving a workpiece in increments of 0.0001 inch.

The outputs of the pulse generators 302, 304 and 306 are coupled via conduits 308, 310, and 312, respectively, to the pulse input 314 of a pulse smoother 316. The pulse smoother 316 is preferably of the type shown in FIG. 2, in which case the pulse input 314 corresponds to the input conduit 110 of the pulse smoother 100. The structure for calibrating the smoother 316 is not shown in FIG. 3 but it is to be understood that it may be identical to that described in connection with the pulse smoother 100.

The output of the pulse smoother 316 is a steady flow of fluid in the conduit 318 which drives a workpiece 330 through a valve 321 which may be identical to the valve 130 of FIG. 2. A back pressure valve 321a and a fluid reservoir 321b may be included, all of which may operate similarly to the corresponding structure of FIG. 2.

Assuming by way of example that it is desired to move the workpiece 320 a distance of 1.1255 inches, the microprocessor 300 may be programmed to actuate the pulse generator 302 to develop 112 fluid pulses, to actuate the pulse generator 304 to develop 5 fluid pulses, and to actuate the pulse generator 306 to develop 5 fluid pulses. In operation, the pulse generators 302, 304 and 306 are actuated sequentially with, for example, the pulse generator 302 first actuated to move the workpiece 320 and then the pulse generators 304 and 306 sequentially actuated to complete the movement of the workpiece 320.

The use of multiple pulse generators with a single pulse smoother is also advantageous to generate workpiece movement at very accurate rates. Such movement may be in terms of rod travel in inches per minutes or rotational movement in threads per inch per revolution, by way of example.

Figure 3:
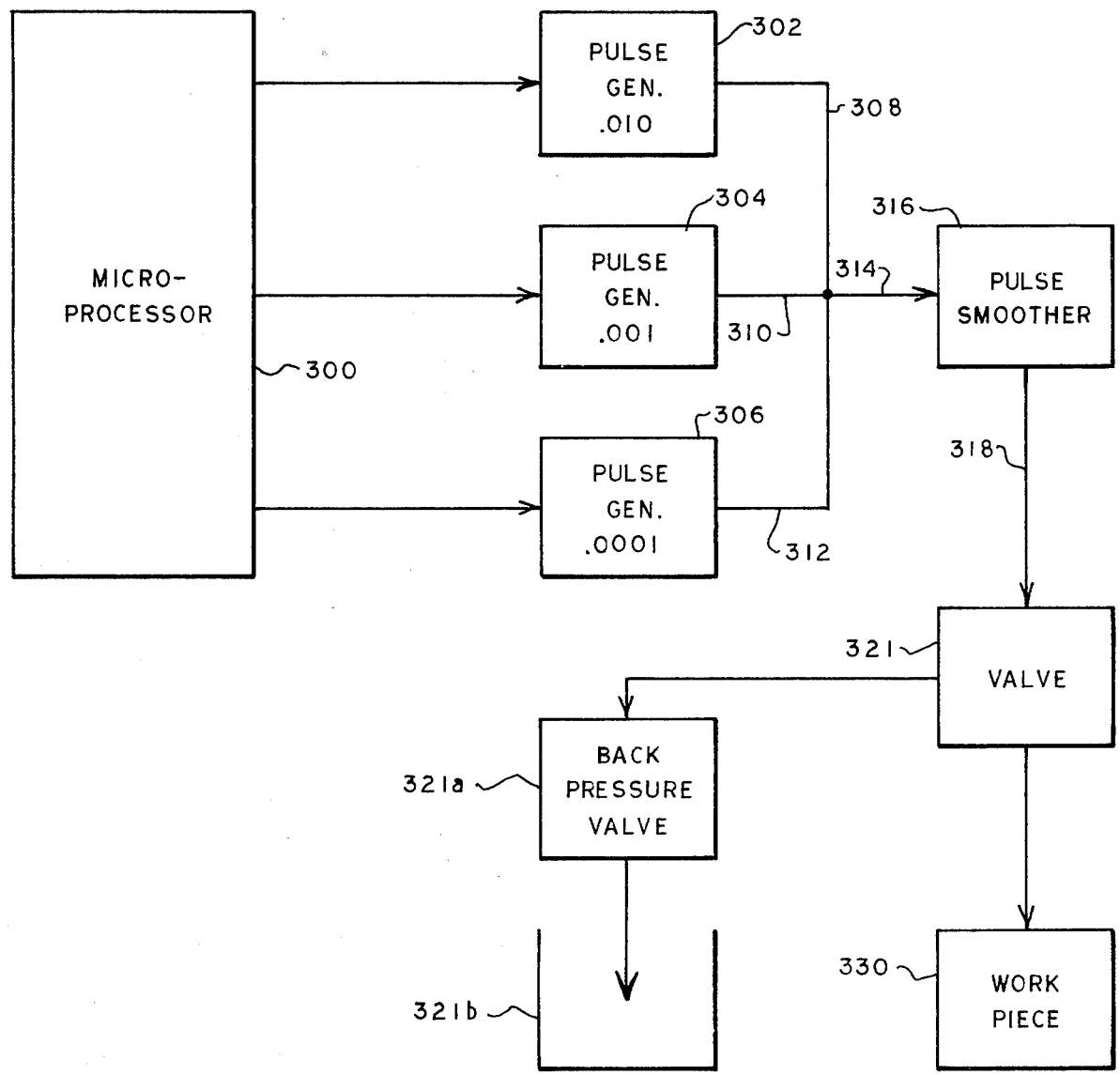
FIG. 3 is a schematic illustration of an exemplary combination of the smoother of FIG. 2 and a plurality of pulse generators of FIG 1.

Assuming that a workpiece is to be moved at a feed rate of 0.0224 inches per revolution, this could be easily achieved by the structure of FIG. 3 by programming the microprocessor 300 to activate the pulse generators 302, 304 and 306 to generate two sets of fluid pulses per revolution, each set of pulses including one pulse from the generator 302, one pulse from the generator 304, and two pulses from the generator 306. In addition, the pulse generators 302, 304 and 306 are all initiated simultaneously, for each set of pulses.

When using a plurality of pulse generators with a single pulse smoother as described immediately above, the pulse smoother should be calibrated by conducting to its chamber 140 (FIG. 2) the outputs of all the pulse generators 302, 304 and 306 for an interval equal to the interval of a single set of pulses. Thus, the smoother 316 will be calibrated to smooth the sum of the pulses into one continuous output.

In some applications it may not be necessary to smooth very small pulses, such as those which provide workpiece movement of very small increments such as 0.0001 inch. Such small increments are frequently too small to be noticed, but bursts of such small pulses applied over one larger pulse may need smoothing.

As has been indicated above, the pulse generator and smoother described above will respond to the digital commands of a microprocessor, and therein lies a substantial advantage over prior analog fluid control systems. For example, when the described pulse generator is driven by a microprocessor, the microprocessor will accept instructions and execute them to produce unlimited workpiece excursions at controlled speeds, with an adjustable dwell between events. Further, multiple pulse generators may be used to drive a plurality of workpieces in simultaneous, overlapping, or sequential operation or any combination thereof. The only limit to such performance is provided by the memory capacity and power of the microprocessor.

The pulse generator and pulse smoother described herein may be used independently of each other or in combination. Of course, a pulse smoother may not be used when incremental movement of a workpiece is desired. When continuous movement of a workpiece is desired, the pulse smoother may be used with other forms of pulse generators, but the preference is to drive the smoother with the pulse generator described herein.

Their combination interfaces a digital electronic control system to a hydraulic system in a reliable and relatively inexpensive structure in which fluid pressure and temperature is not critical.

Although the pulse smoother has been illustrated in terms of a specific preferred structure, it will be obvious to one skilled in the art that many alterations and modifications can be made therein without departing from the spirit and scope of the invention. Accordingly, it is intended that all such alterations and modifications be included within the spirit and scope of the invention as defined by the appended claims.

What is claimed is:

1. A fluid pulse smoother, comprising:
   means defining an enclosed accumulator cavity having an input port for receiving a succession of periodic fluid pulses of a predetermined fluid volume, and having an output port from which the fluid emerges;
   a chamber having an input coupled to the output port of said cavity and having an output communicating with the input to said chamber;
   means for limiting the flow of fluid between the input and the output of said chamber such that a volume of fluid substantially equal to the volume of fluid in a single fluid pulse emerges from the output of said chamber at a substantially constant rate over an interval substantially equal to the period of a single fluid pulse,
   whereby the fluid pulses received by said cavity are substantially integrated and smoothed to form, at the output of said chamber, a continuous flow of fluid at a rate which is substantially equal to the rate at which fluid is received by said accumulator cavity.

2. A fluid pulse smoother as set forth in claim 1 further including a resilient piston disposed at one end of said cavity for urging the fluid in said cavity out of the output port and into said chamber.

3. A fluid pulse smoother as set forth in claim 2 wherein said cavity has first and second ends, the input and output ports of said cavity being located near the first end of said cavity and said piston being located near the second end of the cavity and being spring biased toward said first end.

4. A fluid pulse smoother as set forth in claim 1 wherein said means for limiting the flow of fluid between the input and the output of said chamber includes a movable flow-regulator member disposed in said chamber and adapted to be urged into a position between the input and output of said chamber to restrict the flow of fluid therebetween by a predetermined amount.

5. A fluid pulse smoother as set forth in claim 4 wherein said means for limiting the flow of fluid between the input and the output of said chamber further includes a fluid reservoir having a fluid input, said reservoir being operatively disposed with respect to said flow-regulator member such that the position of said flow-regulator member with respect to the input and output of said chamber varies according to the volume of fluid in said reservoir, and further including means for coupling the fluid input of said reservoir to a source of periodic fluid pulses for an interval substantially equal to the interval between successive fluid pulses.

6. A fluid pulse smoother as set forth in claim 5 wherein said means for coupling the fluid input of said reservoir to a source of periodic fluid pulses includes a valve having an input port coupled to a source of periodic fluid pulses, a fluid exchange port coupled to the input of said reservoir, and means for actuating said valve to couple its input port to its fluid exchange port for an interval substantially equal to the interval between successive fluid pulses.

7. A fluid pulse smoother as set forth in claim 6 wherein said valve includes an output port, and further including a fluid container, means for coupling the output port of said valve to said fluid container, and means for actuating said valve for coupling its fluid exchange port to its output port for emptying the fluid in said reservoir into said fluid container, whereby said reservoir is conditioned to receive a new volume of fluid when fluid pulses of a selected different volume are to be conveyed to said accumulator cavity.

8. A fluid pulse smoother as set forth in claim 7 wherein said valve includes means defining a cylindrical bore having first, second, and third annular grooves around said bore corresponding respectively to said output port, said fluid exchange port, and said input port of said valve, said valve further including a three-position spool disposed for reciprocating in said bore, said spool having a central portion whose diameter is smaller than the diameter of said bore and end portions of diameters substantially equal to the diameter of said bore, the axial length of the central portion of said spool being such that when said spool is unactuated, the central portion of said spool underlies only said second groove, when said spool is actuated to move in a first direction in said bore the central portion of the spool underlies the second and third annular grooves, and when said spool is actuated to move in a second direction the central portion of said spool underlies the first and second annular grooves, whereby the central portion of said spool provides not fluid coupling between the grooves when said spool is unactuated, but provides fluid coupling between the second and third grooves when actuated to move in the first direction and provides fluid coupling between the first and second grooves when actuated to move in the second direction.

9. A fluid pulse smoother as set forth in claim 8 wherein said spool is actuated to move in the first and second directions by a pair of solenoids driving the end portions of said spool.

10. A fluid pulse smoother as set forth in claim 5 including means for manually varying the volume of said reservoir for adjusting the position of said flow-regulator member.

11. A fluid pulse smoother as set forth in claim 10 wherein said means for manually varying the volume of said reservoir comprises a shaft protruding into said reservoir, the extent of the protrusion of said shaft into said reservoir being manually adjustable.

12. A fluid pulse smoother as set forth in claim 5 wherein said chamber comprises an elongated cylindrical bore having a first annular groove corresponding to the output of said chamber and a second annular groove corresponding to the input of said chamber, and wherein said flow-regulator member comprises an elongated member having a first end disposed between said first and second annular grooves in said bore, said first end being tapered so as to constrict the flow of fluid between said first and second annular grooves when moved in the direction of said grooves, and having an opposed end communicating with fluid in said reservoir for movement of said flow-regulator member in correspondence with the volume of fluid in said reservoir, whereby as fluid enters said reservoir, said flow-regulator member is urged by the fluid in said reservoir toward the first annular groove in said bore to constrict the flow of fluid between said first and second annular grooves.

13. A fluid pulse smoother comprising a housing having:

an accumulator cavity having an input port for receiving a succession of periodic fluid pulses of a predetermined fluid volume, and having an output port;

a flow-rate cavity having a first portion and a second portion, said first portion defining a flow-restriction chamber having an input port coupled to the output port of said accumulator cavity and having an output port, said second portion defining a fluid reservoir having an input port;

a movable flow-regulator member disposed in said flow-rate cavity between the fluid-restriction chamber and the fluid reservoir, said flow-regulator member having a tapered end protruding into the flow-restriction chamber and an opposed end facing the fluid reservoir, said flow-regulator member being moved toward said flow-restriction chamber by an increasing volume of fluid in said fluid reservoir for constricting the flow of fluid between the input port and the output port of said flow-restriction chamber; and a valve for coupling the input port of said reservoir to a source of periodic fluid pulses for a predetermined interval so as to fill said reservoir with fluid of a volume sufficient to move said flow-regulator member between the input port and the output port of said flow-restriction chamber such that the fluid output of said flow-restriction cavity is a continuous flow of fluid.

14. A fluid pulse smoother as set forth in claim 13 wherein said valve has an input port coupled to a source of periodic fluid pulses, a fluid exchange port coupled to the input port of said fluid reservoir and an output port, and further including a fluid container, and means for coupling the output port of said valve to said fluid container, a first solenoid for actuating said valve to couple its input port to its fluid exchange port for a predetermined interval, and a second solenoid for actuating said valve for coupling its fluid exchange port to its output port for emptying the fluid in said fluid reservoir into said fluid container, whereupon said fluid reservoir is conditioned to receive a new volume of fluid when fluid pulses of a selected different volume are used.

15. A fluid pulse smoother as set forth in claim 13 further including a spring-biased piston disposed in said accumulator cavity for urging the fluid in said accumulator cavity out of the output port of said accumulator cavity and into the flow-restriction chamber.

* * * * *